Patented Mar. 14, 1933

1,901,656

UNITED STATES PATENT OFFICE

OSKAR KRAMER, OF OPPAU, GERMANY, ASSIGNOR TO I. G. FARBENINDUSTRIE AKTIEN-GESELLSCHAFT, OF FRANKFORT-ON-THE-MAIN, GERMANY

STABLE SUSPENSIONS

No Drawing. Application filed March 16, 1931, Serial No. 523,201, and in Germany March 29, 1930.

The present invention relates to improvements in the production of stable suspensions, and more particularly of suspensions of materials, capable of forming metal carbonyls, in liquid media.

Suspensions of materials capable of forming metal carbonyls, which term is used herein in a broad sense including not only the free metals capable of forming carbonyls or products containing such free metals but also compounds of such metals which can be brought into a form capable of reacting with carbon monoxide with the formation of metal carbonyls by reduction, as for example the oxides or carbonates of the carbonyl-forming metals, are of particular interest for the manufacture and production of metal carbonyls because recently processes have been suggested according to which the said solid initial materials are conveyed into the reaction vessel, which is usually under a rather high pressure, in the form of suspensions or pastes in suitable liquids such as liquid metal carbonyls or hydrocarbons. Such suspensions, however, often have the drawback that the solid suspended matter tends to settle more or less rapidly and then conveying by means of pumps or other conveying devices is of course rendered difficult if not impossible at all. Suspensions of the said solid materials in liquid media are of interest also in connection with other fields of the chemical industry, as for example for the production of alloys.

I have found that very stable suspensions of solids of the nature hereinbefore defined can be prepared by using as the liquid vehicle at least two liquids which are immiscible with each other and which do not dissolve the solid matter to be suspended.

Very good results are obtained in this way for example by the simultaneous employment of liquid metal carbonyls on the one hand and water or aqueous solutions on the other hand. The material to be suspended may be first made into a paste with the metal carbonyl, the paste then being intimately mixed with a little water which is gradually absorbed by the paste by keeping it in vigorous motion as for example by stirring the mass. The amount of water added will generally range between 1 and 20 per cent by weight of the solid material to be suspended and should preferably be about 10 per cent, whereas the amount of liquid carbonyl should preferably be about equal to the weight of the solid matter, though greater or smaller amounts may of course be used. Aqueous solutions of acids, bases, or salts may also be used instead of water without disadvantage though generally the use of water is to be preferred because water does not react with the solid matter to be suspended, as might be the case when adding acids or bases.

Other combinations of at least two liquid media of the aforesaid nature are for example hydrocarbons such as gasoline on the one hand and water or aqueous solutions on the other hand, or metal carbonyls or hydrocarbons on the one hand and glycerine or aqueous suspensions of aluminium hydroxide, iron hydroxide or other jelly-like masses on the other hand. Such aqueous suspensions may be prepared for example by acting with an acid, such as hydrochloric acid, nitric acid or sulphuric acid, on metalliferous residues from the production of metal carbonyls whereby metallic salts are formed in the liquid, filtering the resulting solution and precipitating the hydroxides of the dissolved metals by the addition of sufficient ammonia, if desired after diluting the solution. The jelly-like precipitate, if desired after an addition of water, is mixed with a metal carbonyl or a hydrocarbon whereby a stable mixture is obtained.

As has been pointed out in the foregoing more than two liquid media of the said nature may be employed, for example very stable pasty masses are obtained by employing water, a metal carbonyl and a hydrocarbon oil of high boiling point as the liquid vehicle.

The size of the solid particles present in the suspensions according to the present invention should as a rule not exceed 0.25 millimetre in diameter, though in some cases particles up to 1 millimetre in diameter may be kept in stable suspension.

The following examples will further illustrate the nature of this invention, but the invention is not restricted to these examples. The parts are by weight.

*Example 1*

150 parts of fined grained reduced roasted pyrites which when made into a paste alone with 150 parts of iron carbonyl rapidly settled out from the suspension, are stirred with 150 parts of iron carbonyl and 15 parts of water. A paste is formed which only separates a small amount of carbonyl even when allowed to stand for long periods of time and which may be very satisfactorily pumped.

15 parts of aqueous ammonia solution containing 17 grams of ammonia per liter, or 15 parts of hydrochloric acid containing 17 grams of hydrogen chloride per liter, or 15 parts of common salt solution containing 100 grams of common salt per liter, may be employed instead of the 15 parts of water with the same result.

*Example 2*

50 parts of nickel powder are made into a paste with 22 parts of iron carbonyl; the resulting suspension settles very rapidly so that already after 4 minutes 6.7 parts of iron carbonyl free from solid are separated at the top of the mixture. After intimately mixing with 1.5 parts of water, the suspension is very stable and during the said time only 0.6 part of iron carbonyl are separated.

Similar results are obtained when preparing the paste from 50 parts of nickel powder and 50 parts of iron carbonyl and then adding 1.5 parts of water.

*Example 3*

100 parts of reduced roasted pyrites are made into a paste with 65 parts of gasolene, whereupon 2 parts of water are added. By intimately mixing the said ingredients a very stable paste is obtained which does not tend to settle even on long standing.

*Example 4*

100 parts of reduced roasted pyrites are made into a paste with 100 parts of iron carbonyl. 5 parts of glycerine are added. A stable suspension is obtained.

*Example 5*

100 parts of nickel powder are suspended in 50 parts of gasoline. The suspension becomes stable by stirring in 2 parts of water.

What I claim is:—

1. As new articles of manufacture stable suspensions, of which the solid phase comprises at least one material capable of forming metal carbonyl and the liquid phase comprises a liquid metal carbonyl and at least one liquid immiscible with the metal carbonyl and not dissolving the solid phase.

2. As new articles of manufacture stable suspensions, of which the solid phase comprises at least one material capable of forming metal carbonyl and the liquid phase comprises a liquid metal carbonyl and water.

3. As new articles of manufacture stable suspensions, of which the solid phase comprises at least one metal capable of forming metal carbonyl and the liquid phase comprises at least two liquids immiscible with each other and not dissolving the solid phase.

4. As new articles of manufacture stable suspensions, of which the solid phase comprises at least one metal capable of forming metal carbonyl and the liquid phase comprises a liquid metal carbonyl and at least one liquid immiscible with the metal carbonyl and not dissolving the solid phase.

5. As new articles of manufacture stable suspensions, of which the solid phase comprises at least one metal capable of forming metal carbonyl and the liquid phase comprises a liquid metal carbonyl and water.

In testimony whereof I have hereunto set my hand.

OSKAR KRAMER.